Aug. 24, 1937. LE ROY WOTTRING 2,091,173
APPARATUS FOR ORTHOPTIC TRAINING PURPOSES
Filed April 23, 1935 9 Sheets-Sheet 1

INVENTOR.
Le Roy Wottring.
BY
ATTORNEYS.

INVENTOR.
Le Roy Wottring.
ATTORNEYS.

Aug. 24, 1937.    LE ROY WOTTRING    2,091,173
APPARATUS FOR ORTHOPTIC TRAINING PURPOSES
Filed April 23, 1935    9 Sheets-Sheet 3

INVENTOR.
Le Roy Wottring
BY
ATTORNEYS.

Aug. 24, 1937.    LE ROY WOTTRING    2,091,173
APPARATUS FOR ORTHOPTIC TRAINING PURPOSES
Filed April 23, 1935    9 Sheets-Sheet 4

INVENTOR.
Le Roy Wottring.
BY
Cotter & Mahoney
ATTORNEYS.

Aug. 24, 1937. LE ROY WOTTRING 2,091,173
APPARATUS FOR ORTHOPTIC TRAINING PURPOSES
Filed April 23, 1935 9 Sheets-Sheet 5

INVENTOR.
Le Roy Wottring.
BY
ATTORNEYS.

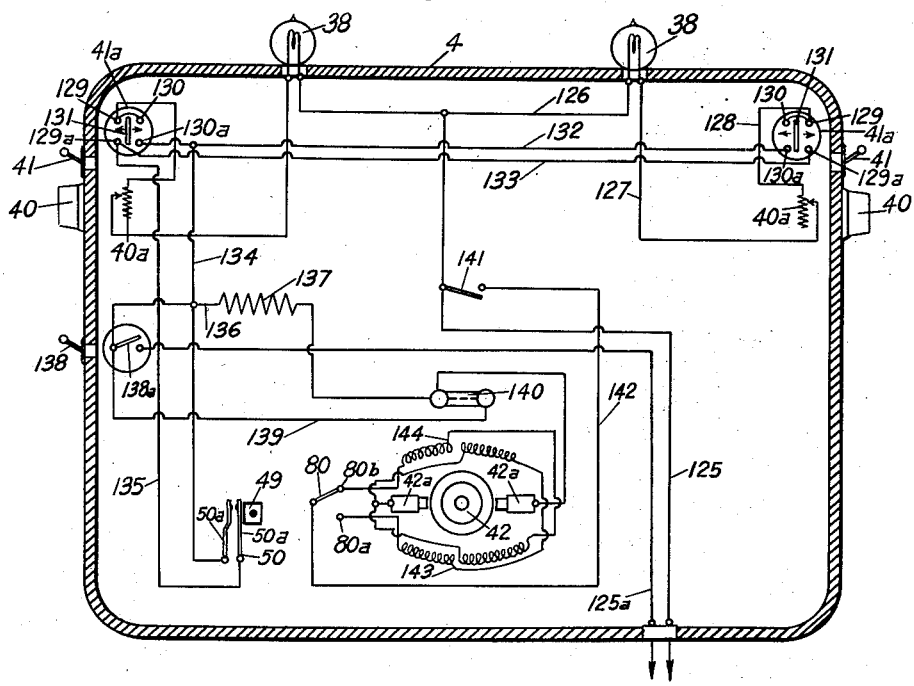

Aug. 24, 1937. LE ROY WOTTRING 2,091,173
APPARATUS FOR ORTHOPTIC TRAINING PURPOSES
Filed April 23, 1935 9 Sheets-Sheet 7

INVENTOR.
Le Roy Wottring.
BY
ATTORNEYS.

Aug. 24, 1937.  LE ROY WOTTRING  2,091,173
APPARATUS FOR ORTHOPTIC TRAINING PURPOSES
Filed April 23, 1935  9 Sheets-Sheet 8

INVENTOR.
Le Roy Wottring.
BY
ATTORNEYS.

Aug. 24, 1937. LE ROY WOTTRING 2,091,173
APPARATUS FOR ORTHOPTIC TRAINING PURPOSES
Filed April 23, 1935 9 Sheets-Sheet 9

INVENTOR.
Le Roy Wottring.

ATTORNEYS.

UNITED STATES PATENT OFFICE 2,091,173

APPARATUS FOR ORTHOPTIC TRAINING PURPOSES

Le Roy Wottring, Lorain, Ohio, assignor to The Wottring Instrument Company, Lorain, Ohio, a corporation of Ohio Application April 23, 1935, Serial No. 17,828

35 Claims. (Cl. 88—20)

My invention relates to apparatus for orthoptic training purposes. It has to do particularly with the provision of an apparatus which may be effectively used in a method for directing the exercising of the muscles of the eyes to improve the tonicity thereof and to correct conditions and habits of improper innervation.

In the prior art, some efforts have been made to exercise the eyes for the purpose of overcoming the weaknesses thereof. However, in the main, these efforts have been of such a nature that the benefits derived therefrom have been temporary. In some cases, the results have been even harmful to the patient. Such prior art devices as have found some favor have been lacking in any adequate means for properly measuring the imbalances and other defects sought to be corrected. Consequently, it has been necessary to employ instruments, other than the eye exercising instrument, to first determine the imbalances of the eyes in order to be able to subsequently treat the eyes with the eye exercising instrument to overcome the imbalances.

In addition to this, many of the prior art machines have been so constructed and operated that attempts to overcome improper habits of the eyes have resulted in the formation of other improper habits, in many cases more harmful than the original imbalances or defects. For example, efforts have been made to exercise the eyes by causing them to observe two targets which are thereupon moved towards or from each other so that the muscles of the eyes in seeking to follow such targets are exercised. Exercising of the eyes is effected by this method, but the difficulty is that the movement induced is comparatively abnormal or at least a movement that simulates a relatively small portion of the normal operations or movements of the eyes. The movement induced by this prior art method tends to set up improper habits, which will be difficult to overcome, since such movement is in conflict with the normal and proper habits of movement of the eyes which normally tend to move together to different points of fixation. In order to properly exercise the eyes, it is not only necessary to impart the desired motor nerve impulses to the eye muscles but also to establish over their proper paths the reciprocal innervations as well. These reciprocal innervations and their proper training are of extreme importance and seem to have been completely overlooked in prior art instrumentation and technique. Exercising of the eyes merely by moving targets towards or from each other, as indicated, places a limitation on the exercise in that fusion may be lost if the targets are moved too far apart or too close together.

Likewise, machines have been devised involving a plurality of targets which are rotatable simultaneously but independently while some rocking movement is also imparted to each target. The independent rotation of such targets tends to interfere with proper fusion and any rocking motion imparted to such targets is fatal to fusion and may be harmful to the patient. In many cases suspension or suppression of vision has occurred in one eye due to muscular imbalances which make it impossible to maintain binocular single vision. In these cases, duction reserves are so lacking that the eyes cannot be immediately made to deviate from their assumed position and to fixate on the usual targets, this being especially true of vertical imbalances due to the fact that the vertical duction reserves in normal man are small. This condition makes it imperative that the targets once placed in line with the visual axes of the eyes, be maintained in a perfectly horizontal plane throughout any and all excursions which these targets may be caused to take. A slight rocking in a vertical plane of either target would cause a break in fusion and disrupt the procedure for properly exercising the eyes.

One of the objects of my invention is to provide an apparatus capable of meeting all needs of orthoptic training in all its phases, namely: first, as an aid in the reduction of amblyopia ex anopsia; second, to establish simultaneous binocular vision; third, for stereoscopic fusion training; fourth, for the building of duction reserves for comfortable vision.

Another object of my invention is to provide orthoptic training apparatus which is of such a nature that it may first be employed for quickly and accurately detecting the imbalances or other defects of the eyes and subsequently be used for correcting or overcoming such imbalances or other defects.

Another object of my invention is to provide apparatus which is of such a nature that it may be employed in subjecting the eyes to training in such a manner as to induce normal habits only and wherein the results of training will be of permanent value.

Another object of my invention is to provide an apparatus, the principles of which are based upon the recognition that all the associated movements of the eyes become more or less habitual through repetition, and which is designed to establish through rhythmic excursions of the eyes, both the desired motor nerve impulses and the direction of the reciprocal innervations over their proper paths, thus, accomplishing proper group action of not only the muscles of each eye but a coordination of both groups in their normal versions in all meridians.

Another object of my invention is to provide orthoptic training apparatus wherein the usual procedure of treatment is reversed in that vision in the amblyopic or suppressing eye is developed and fusion and stereopsis is trained, before attempting the stimulating of ductions, thus developing tonicity and motility more rapidly. Stimulation of the extrinsic muscles in the desired direction is created in much less time with the aid of stereopsis, and stereopsis must be present before permanent relief or cure can be obtained by orthoptic training.

Another object of my invention is to provide a device of the type indicated wherein means is provided for placing targets to be observed in line with the visual axis of each eye before either fusion or stereopsis is sought to be induced and for holding such targets in such positions during the procedure of exercising the eyes.

Another object of my invention is to provide a wide latitude of prismatic effect both base-in and base-out without breaking the binocular single vision and also to provide means for producing vertical prismatic effect of any necessary or desired amount without interruption of binocular single vision.

Various other objects and advantages of my invention will appear as this description progresses.

In its preferred form, the orthoptic training apparatus which I provide comprises a stage which is designed to be moved in rotary paths at variable distances from a central point. This stage carries two laterally spaced targets, to be viewed by the patient, which are adjustable towards and from each other and which are independently adjustable vertically. These targets are adjustable both laterally and vertically relative to dioptric calibrations carried by scales on the stage. Thus, both the targets may be adjusted to meet both horizontal and vertical imbalances of the eyes of the patient being treated and the conditions of imbalances of the eyes may be initially measured, while measurements may be taken from time to time during the training exercises, to indicate progress of the training. Prisms are provided through which the patient may view the targets and these prisms make possible a wider range of adjustment and wider possibilities of excursion of the eyes during the training exercises. Because the stage which carries the targets may be moved in rotary paths at variable distances from a central point, the extent of the rotary excursions of the eyes may be readily varied. Also, means is provided for positively controlling the speed of the rotary movement of the stage and for reversing the rotary movement of the stage at intervals in order that the eyes may be caused to follow proper rhythmic excursions.

The apparatus is further provided with a septum which insures that each eye will view one target only. Independent illuminating means is provided for each target and the septum also serves to render the illumination of one target independent of the other. The illuminating means are of such a nature that the intensity of illumination on each target may be regulated independently of the other and flashing may even be resorted to for concentration of vision upon both targets or either of the targets. Auxiliary plus and minus spheres are preferably provided in connection with the prisms so that every possible combination of accommodation and convergence can be stimulated. Furthermore, the device is so constructed that perfect visibility of the patient's eyes and their movements at all times enables the operator to check up on the target fixation, motility or alternation.

The preferred embodiment of my invention is illustrated in the accompanying drawings wherein similar characters of reference designate corresponding parts and wherein:

Figure 15 is a perspective view showing the mechanism for operating the motor reversing switch.

Figure 16 is a perspective view, partly broken away, of the speed governor which is employed for governing and varying the speed of the rotary movement of the stage.

Figure 17 is a diagram of the electrical circuits employed with my machine for controlling various devices.

Figure 25 is a view illustrating a modified arrangement for obtaining flashing of the lights which are employed for illuminating the targets.

Figure 1:
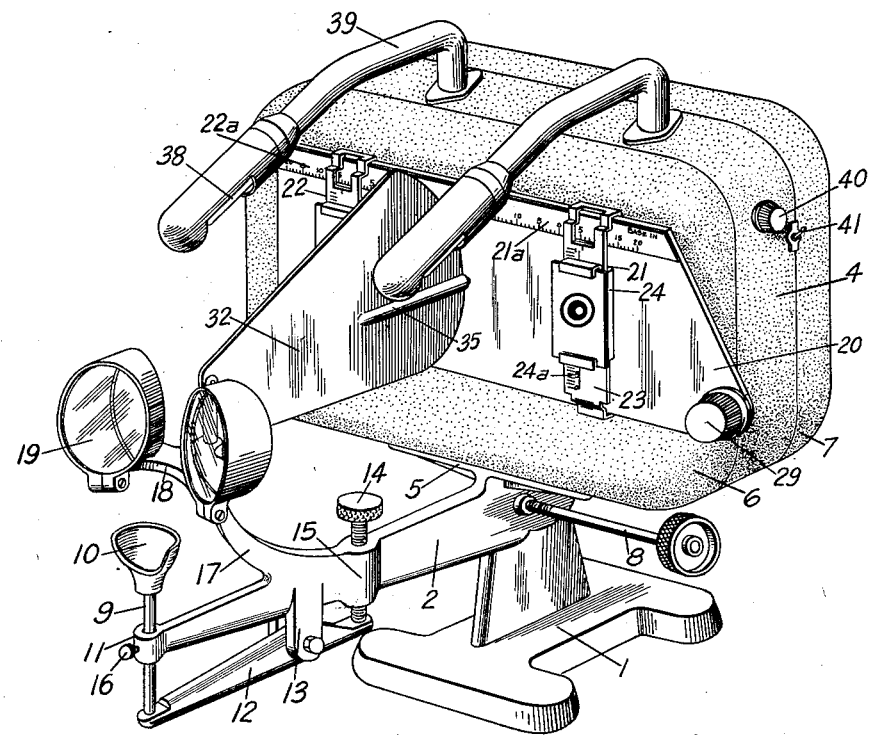
Figure 1 is a perspective view of an orthoptic training apparatus made in accordance with the principles of my invention.
Figure 2:
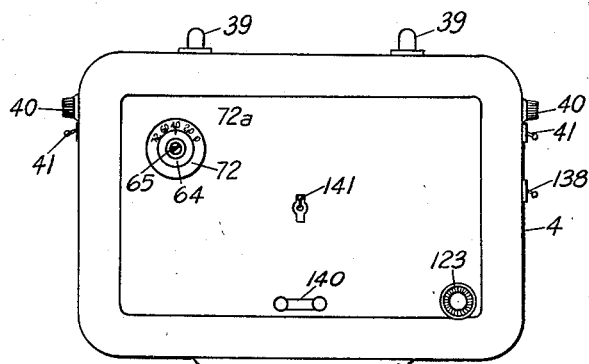
Figure 2 is a rear elevation of the apparatus shown in Figure 1.
Figure 3:
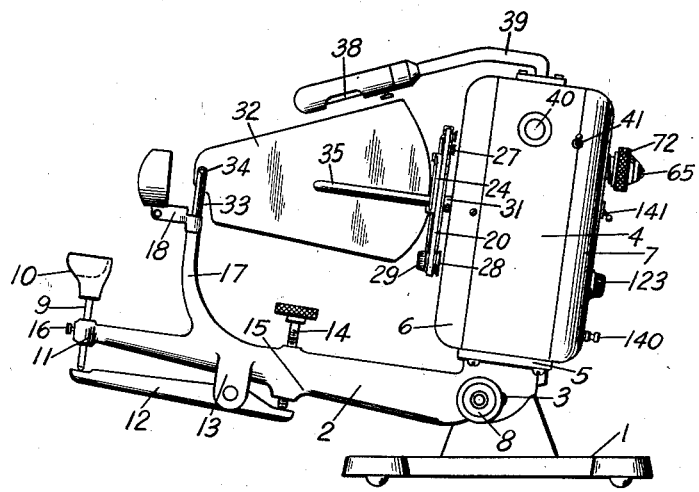
Figure 3 is a side elevation of my apparatus.
Figure 4:
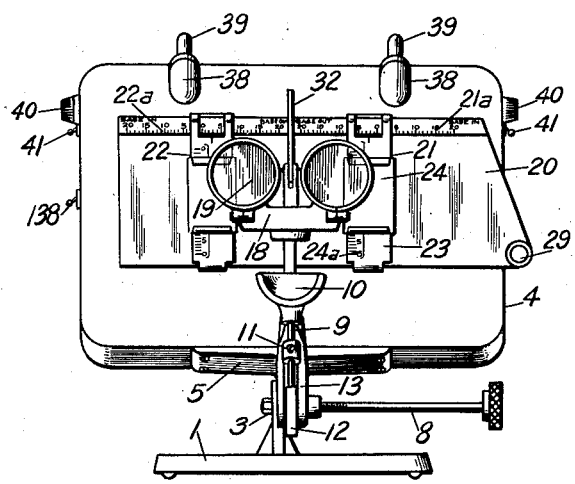
Figure 4 is a front elevation of my apparatus.

With reference to the drawings and particularly to Figures 1 to 4 inclusive, I have illustrated my invention as comprising a base 1 which carries and supports the entire machine. This base 1 has a forwardly extending arm 2 pivoted thereto as at 3 for swinging in a vertical plane. A casing or housing 4 is carried by a horizontal shelf 5 which is formed integrally with the rear end of the arm 2 and is suitably secured thereto. The housing 4 carries the operating mechanism of the machine which will be described in detail subsequently. It preferably has a removable front 6 and a removable back 7. A set screw 8 which is threaded through an opening in the rear end of arm 2 and the inner end of which cooperates with the vertical portion of the base 1, is provided for holding the arm 2 in any adjusted position suitable for the particular patient.

The arm 2 extends forwardly a considerable distance and has a pin 9 which carries a chin support 10 slidably mounted in a sleeve 11 at its outermost extremity. The lower end of the pin 9 rests against the forward end of a lever 12 which is pivoted between a pair of depending lugs 13 formed on the arm 2 intermediate its ends. The rear end of this lever 12, which is pivoted for movement in a vertical plane, is engaged by the lower end of a screw 14 which is threaded through a sleeve 15 disposed intermediate the ends of the arm 2. It will be apparent that by adjusting the screw 14, the height of the chin support 10 may be varied to suit the particular patient. It may be further held from turning by a screw 16 threaded through sleeve 11 and fitting in a keyway or groove.

The arm 2 adjacent its forward end has an upwardly extending vertical support 17 formed integrally therewith. The upper end of this vertical support carries a frame 18 in which is disposed a pair of sphero-prism lenses 19. It will be apparent that the patient may rest his chin on the support 10, which may be properly adjusted for him, so that he may look through the lenses 19. The sphero-prism lenses 19 are so disposed that they are base-out. These base-out prismatic lenses are provided for a purpose to be explained.

Figures 7, 8:
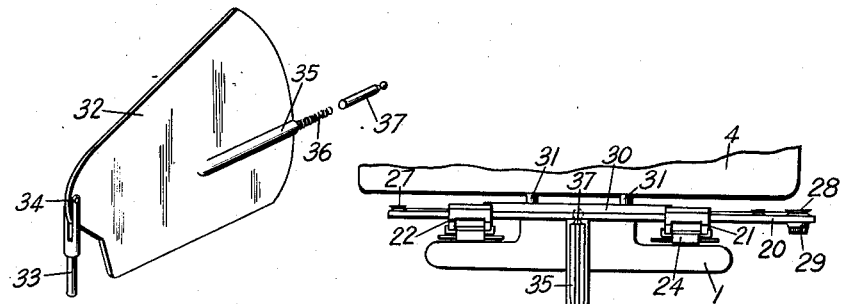
Figure 7 is a perspective view of the septum used for separating the vision of one eye from the other and for aiding in providing independent illumination on each target.
Figure 8 is a plan view of the forward portion of the apparatus.
Figure 9:
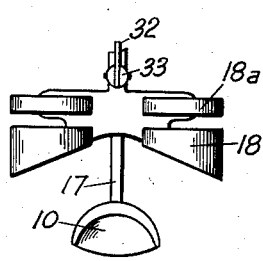
Figure 9 is a view illustrating how additional prisms or auxiliary plus or minus lenses may be applied.

In Figure 9 I show how a pair of lens frames 18a may be removably mounted on the device behind the frame 18 which carries the base-out sphero-prisms. Each of these frames has a means for attachment such as a depending pin on its lower edge (not shown) which removably fits in a socket 180a (Figure 8) formed in a support on the upper end of arm 17. Each frame 18a may be removed or replaced on the device independently of the other. The frames 18a are adapted to carry auxiliary plus or minus spheres for stimulating any possible combination of accommodation and convergence, as will be explained more fully hereinafter. Frames 18a may also be provided which carry auxiliary prisms either base-in or base-out which may be employed when dealing with the extreme types of phoria or strabismus. If desired, means may be provided for mounting a second set of the frames 18a behind the first set. Thus, it would be possible to have one set of plus or minus lenses for stimulation or relaxation of accommodation and convergence and also have a set of auxiliary prisms for use in treating extreme types of phoria or strabismus.

At the front and outside of the housing a stage 20 (Figures 1, 3 and 4) is mounted in such a manner that it may be moved in a rotary path about a center. This rotary path may be varied and the speed of the rotary movement may be positively controlled. The mechanism for moving the stage in a rotary path and controlling the movement will be described in detail hereinafter.

Figure 5:
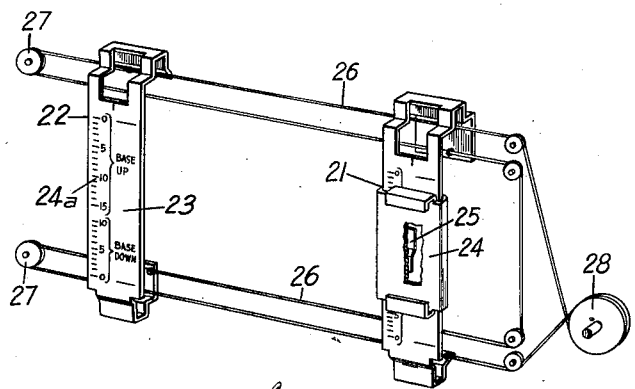
Figure 5 is a perspective view showing the members which hold the targets to be used by the patient and illustrating the means for moving said members laterally of the stage.
Figure 6:
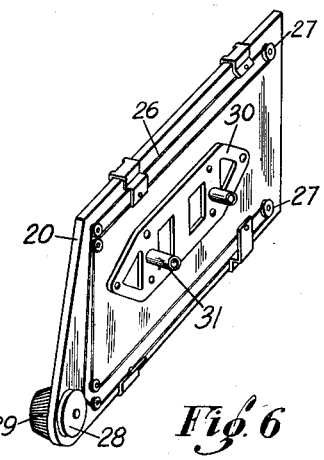
Figure 6 is a rear perspective view of the stage which has the target or card-holding members adjustably mounted thereon.

The stage 20 preferably embodies a metallic plate which has target or card-holding members 21 and 22 mounted thereon. As shown best in Figure 5, each of the card or target-holding members comprises a vertically disposed strip 23 having a calibrated scale 24a thereon for indicating vertical imbalances of the eyes. Each end of the strip 23 is bent rearwardly and then into overlapping relation to the stage 20 (Figure 6). Thus, each target-holding member is mounted in such a manner that it may be moved longitudinally of the stage 20. On each plate 23 a card-holding member 24 is slidably mounted for vertical movement and is held in any adjusted position by a flat spring 25 attached to strip 23 and pressing against member 24.

I provide means for simultaneously moving the target-carrying members 21 and 22 along the stage away from each other or closer together. This means comprises a flexible cord 26 which is passed around a plurality of pulleys 27 and is attached to the members 21 and 22 in the manner indicated in Figures 5 and 6. This cord is also passed around a larger pulley 28 at the lower right-hand corner of the stage which is rotatable by a knurled knob 29. It will be apparent that when the knob 29 is rotated in one direction, the members 21 and 22 will be moved away from each other and when rotated in the opposite direction they will be moved towards each other.

The upper edge of the member 24 will cooperate with the scale 24a in indicating vertical imbalances. Scales 21a and 22a (Figure 4) are provided along the upper edge of the stage 20 for cooperating with a mark 21b on each of the members 21 and 22 respectively for indicating horizontal imbalances of the eyes.

The stage 20 is provided with a member 30 riveted or otherwise secured to the rear surface thereof. This member 30 has a pair of spaced socket members 31 which are in horizontal alignment with each other. The socket members 31 are adapted to removably receive the ends of pins which project forwardly through the front wall of the housing 4, as will be explained later. Thus, the stage may be removably mounted at the front of the housing 4.

I provide a septum member 32 which is in the form of a plate preferably of the shape illustrated in the drawings. This septum has a pin 33 (Figure 7) pivotally carried as at 34 at the forward end thereof. Adjacent the rear end thereof is formed a tubular member 35 which receives a compression spring 36 and the inner end of a pin 37 which will be free to slide therein. The spring 36 normally tends to force the pin 37 outwardly from the tubular member 35 but means is provided for preventing it from being forced completely therefrom into the position shown in Figure 7. As shown best in Figures 1 and 3, the septum 32 is adapted to be vertically disposed with the lower end of pin 33 fitting into a socket formed in the upper end of the vertical support 17 of arm 2. The rear end of the pin 37 will project into a socket formed centrally of the stage 20. It will be apparent that the septum may be readily mounted on the device regardless of the position of the stage 20 and that it is connected to member 17 and the stage 20 in such a manner as not to interfere with the rotary movement of the stage.

The septum is disposed between the two target-carrying members and will insure that each eye will only view one target. A light 38 is provided for each target and mounted on the outer end of an arm 39 which extends forwardly from housing 4. The septum permits the illumination of one of the targets independent of the other. Each of the lights is controlled independently of the other. A rheostat switch 40 is provided for controlling the intensity of illumination of each light or to turn out the light completely, and a switch 41 is provided for each light to cause flashing thereof or to cause constant illumination thereof. These switches are connected into the circuit in a manner to be described. Either light may be turned on or off, its intensity controlled or it may be caused to flash independently of the other light.

Figure 10:
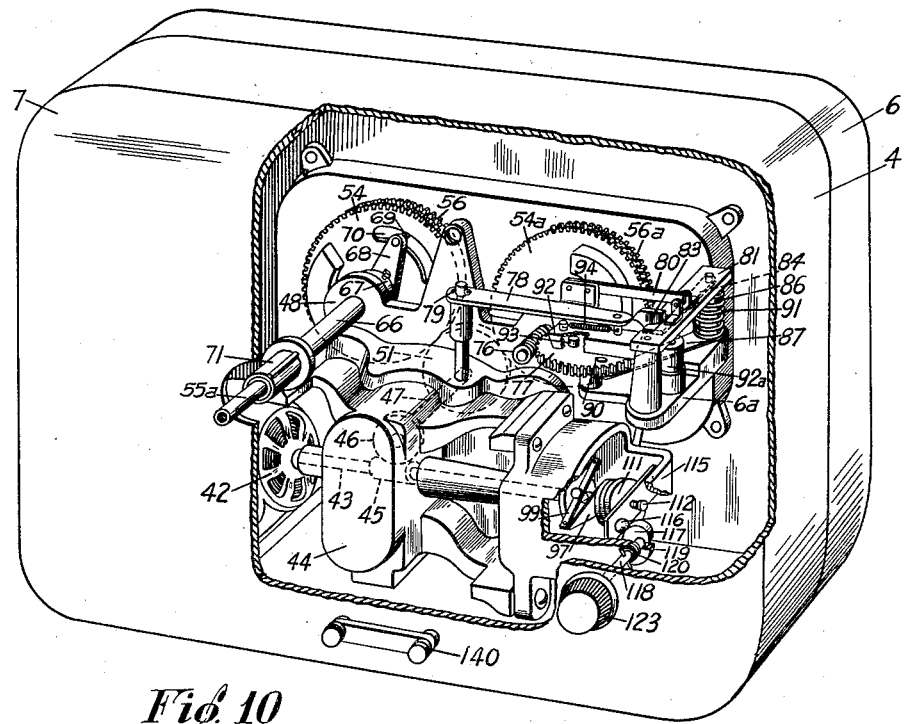
Figure 10 is a rear perspective view of the apparatus, with the housing cut away, showing the operating mechanism of the apparatus.
Figure 11:
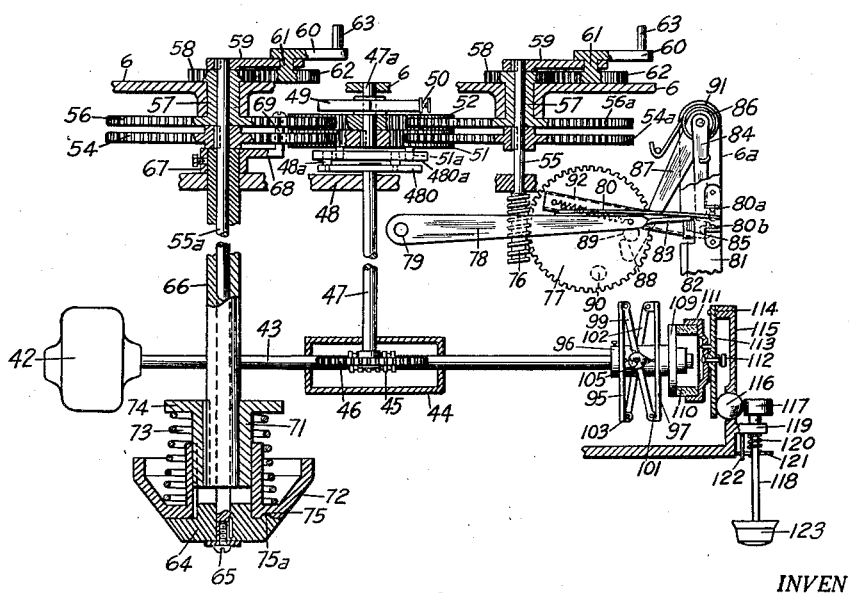
Figure 11 is a plan view, partly broken away, of the operating mechanism of the machine.
Figure 12:
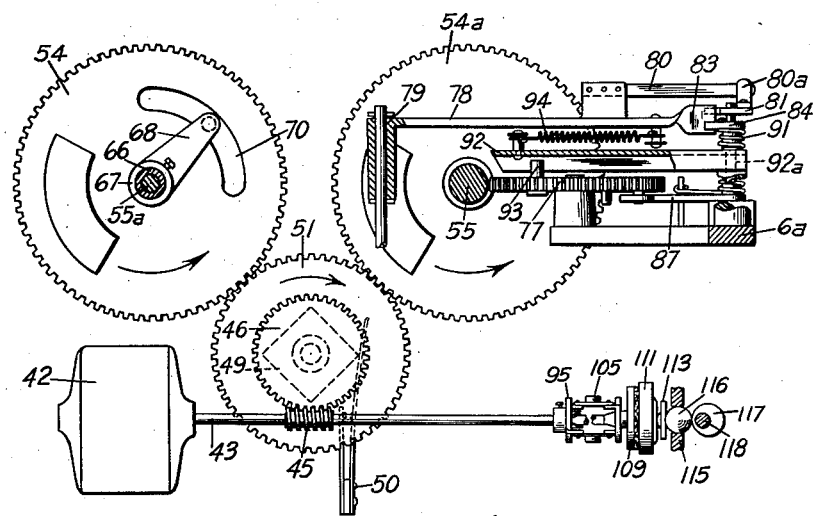
Figure 12 is a rear elevation of the operating mechanism shown in Figure 11.
Figure 13:
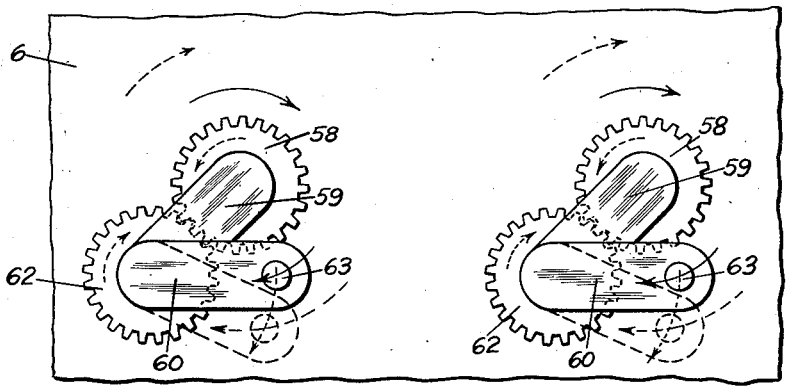
Figure 13 is a detail illustrating the crank arms on which the stage may be mounted and illustrating by dotted lines how these crank arms may be adjusted to vary the rotary movement of the stage.

The operating mechanism of the machine which is contained in the housing 4 will now be described in detail. This mechanism is best shown in Figures 10 to 15 inclusive. It comprises an electric motor 42 of the reversible type which drives a shaft 43. This shaft 43 is connected to speed reduction gearing disposed in a housing 44. This speed reduction gearing is illustrated in Figures 11 and 12 as comprising a worm 45 on shaft 43 and a worm gear 46 mounted on the rear end of a forwardly extending shaft 47, although this is for illustrative purposes only. The motor 42, gear housing 44 and all the other operating mechanisms are mounted, as shown in Figure 10, on the front member 6 of the housing so that, when this member 6 is removed, all the operating mechanism will be removed from the housing as a single unit.

The shaft 47 extends forwardly towards the front of the housing and is rotatably supported in a suitable manner in a supporting structure 48 which is attached to the front plate 6 of the housing. The shaft 47 has its forward end operatively connected to a stub shaft 47a disposed in alignment therewith. To connect these two shafts together I provide a disk 480 which is keyed on the forward end of shaft 47 and which has a plurality of pins 48a thereon (Figure 11) that project into openings formed in a disk member 480a made of rubber or other suitable material. This disk 480a of rubber also has a plurality of openings which receive a plurality of pins 51a that project from the gear 51 which is keyed on the rear end of the stub shaft 47a. Thus, the shaft 47 will be connected to the shaft 47a through the medium of the rubber disk 480a which will "give" slightly when the motor is reversed and, consequently, the gears driven by the shaft 47a will not be injured by quick reversal of said shaft and objectionable noise will be eliminated.

Adjacent its forward end, the shaft 47a has a square plate 49, which is formed of non-conducting material, keyed thereon. Adjacent this member 49 and attached to a suitable support are a pair of spaced contact members 50 which serve as a flasher switch for flashing the lights 38. These contact members are connected into the electrical circuits of the machine in a manner to be explained later. As shown best in Figure 12, one of these contact members extends upwardly a greater distance than the other and resiliently contacts with the edge of the member 49. When the member 49 is in the position indicated in this figure, the contact members will be spaced apart but when it rotates slightly they will come into contact with each other. During each rotation of the member 49, the contact members will be caused to contact with each other and to move apart four times.

The gear 51 (Figure 11) is keyed on the shaft 47a. A second gear 52 is disposed loosely on the shaft 47a in front of gear 51 and is of the same size. This gear 52 is held in frictional contact with the gear 51. Consequently, when the shaft 47a rotates, gear 51 being keyed thereto will also rotate and since gear 52 is held in frictional contact therewith, it will also rotate therewith but may be forcibly advanced or retarded as will appear later.

The gear 51 meshes with a larger gear 54a which is keyed on the shaft 55 that is mounted on the front plate 6 in such a manner that it is free to rotate. The gear 52 meshes with a gear 56a which is the same size as gear 54a and which is free to rotate on the shaft 55. The gear 56a has a hub 57 that extends through the plate 6 and has a pinion 58 integrally formed thereon. The shaft 55 extends through the hub 57 and pinion 58 and has an arm 59 keyed thereon. The arm 59 has a second arm 60 pivoted to its outer end by a pivot member 61 passing through an opening in the outer end thereof. This member 61 has a pinion 62 formed integrally therewith which is of the same size as pinion 58 and meshes therewith. The extreme outer end of the arm 60 has a pin 63 disposed thereon and this pin is adapted to fit into one of the sockets 31 formed on the rear of the stage 20. The arms 59 and 60 cooperate to form a crank arm which may be adjusted in a manner to be described.

The gear 51 meshes with a second gear 54, at the opposite side, which is keyed on a shaft 55a. The gear 52 meshes with a second gear 56 which is rotatably mounted on the shaft 55a. This gear 56 has a hub 57 extending through the plate 6 and having a pinion 58 integrally formed thereon. The outer end of the shaft 55a has an arm 59 keyed thereon and this arm 59 has an arm 60 pivoted thereto by a member 61 which has a pinion 62 formed integrally therewith and which meshes with the pinion 58. This arm 60 also carries a pin 63.

The shaft 55a extends rearwardly and projects through the rear plate of the housing 4. The extreme rear end of the shaft 55a has a disk 64 keyed thereto which will be disposed outside of the housing. It is removably held in place by a screw 65. The shaft 55a has a sleeve 66 mounted thereon and rotatable relative thereto and in an opening in the support 48 in which it is disposed. The extreme forward end of this sleeve 66 has a collar 67 (Figure 14) keyed thereon which carries a radially extending arm 68. The outer end of this arm 68 has a forwardly projecting pin 69 which extends through an arcuate slot 70 formed in the gear 54 which is disposed on shaft 55a. The forward end of this pin 69 fits tightly into an opening formed in the gear 56.

The rear end of the sleeve 66 has a collar 71 keyed thereon. This collar in turn has a knob member 72 of annular form splined thereon. A compression spring 73 is provided which bears against a flange 74 on member 71 and against the member 72 as indicated. This spring normally tends to maintain the member 72 in engagement with the member 64. The member 64 is provided with a plurality of circumferentially spaced holes or sockets 75 on its forward surface any one of which is adapted to cooperate with a projection 75a formed in the rear end of member 72. The member 72 will also be disposed outside of the housing 4.

The mechanism just described is provided for varying the effective length of the crank arms, formed by arms 59 and 60, or in other words, the position of the pin 63 relative to the center of rotation of the crank arm. In order to make this adjustment, the knob member 72 is pressed inwardly against the force of spring 73 to disengage the projection 75a on member 72 from the sockets in member 64. This projection and these sockets normally prevent rotation of sleeve 66 relative to shaft 55a but when disengaged permit such relative rotation. The sleeve 66 is then rotated on shaft 55a by rotating knob 72. Rotation of sleeve 66 will cause swinging of the arm 68. Consequently, the gear 56 on shaft 55a will rotate relative to gear 54 on such shaft. This will cause rotation of gear 52 on shaft 47a relative to gear 51, such rotation being permitted because the gears 51 and 52 are merely held in frictional contact. This will also cause rotation of gear 56a on shaft 55 relative to the gear 54a carried by said shaft.

When the gears 56 and 56a are rotated, the effective lengths of the crank arms are varied. This is due to the fact that when gear 56 rotates on the shaft it rotates pinion 58. This also causes rotation of pinion 62 and swinging of the arm 60 relative to the arm 59. Thus, the arms 59 and 60 may be adjusted from a position where they are superimposed and where the pin 63 is directly in line with the shaft upon which the crank arm rotates to a position where the arm 60 extends outwardly from the arm 59 and is in alignment therewith. The arm 60 may be swung laterally to either side of the arm 59. In other words, the arm 60 may be adjusted to any position relative to the arm 59. It will be apparent that both of the crank arms will be adjusted simultaneously and in exactly the same manner and to the same degree. The distance between the two pins 63 will always remain constant. When the crank arms have been adjusted as desired, the knob 72 is released and the spring 73 will cause the projection on member 72 to fit in one of the sockets in member 64. Thereafter the sleeve 66 will be precluded from rotating relative to shaft 55a and the crank arms will remain in their adjusted positions. The knob 72 preferably has calibrations 72a thereon which cooperate with a mark on member 64 for indicating the throw or adjusted position of the crank arms.

The stage 20 is adapted to be mounted removably on the crank arms. The socket members 31 on the stage will receive the pins 63. When the motor 42 is started, it rotates shafts 43, 47 and 47a. Since gears 51 and 52 are held in frictional contact and since gear 51 is keyed to shaft 47a, both of these gears will rotate with said shaft. Both gears 56 and 56a will be rotated and both gears 54 and 54a will be rotated. Each gear 54 and 54a will rotate at the same speed as the gear 56 which is mounted on the same shaft therewith. Consequently, shafts 55 and 55a will both be rotated and both crank arms, which carry the stage, will be swung around their centers of rotation. As previously described, the throw of the crank arms may be adjusted and this adjustment may occur either during the rotary movement of the stage or when it is stationary. The stage will move in a rotary path and this rotary path may be varied merely by adjusting the crank arm by rotating knob 72 relative to member 64.

As previously stated, the motor 42 is of the reversible type. I provide means for automatically operating a switch which will reverse this motor. As shown best in Figures 10, 11, 12 and 15, this means comprises a worm 76 on the rear end of shaft 55 which meshes with a worm gear 77. This worm gear 77 is rotatably mounted on a support 6a that is attached to the front plate 6 of the housing and is made of non-conducting material.

Directly above and extending over the worm gear 77 is an arm 78 which is pivoted to a vertical support as at 79 for swinging in a horizontal plane. This arm 78 has an upwardly projecting lug to which a resilient contact member 80 is fastened. This contact member 80 is adapted to be moved into contact with either of two spaced contact points 80a and 80b which are supported on an insulating plate 81. Plate 81 is supported on the support 6a as indicated in Figure 10. The contact points 80a and 80b are connected into the electrical circuits of the machine in a manner to be described.

The plate 81 is notched as at 82 (Figure 11) and a vertically disposed portion 83 of the arm 78 projects into this notch. The edges of the notch limit the swinging movement of this arm. A latch member 84 has a lug 85 (Figure 15) on its outer end which in one instance keeps the arm 78 in the position illustrated in Figure 11. This latch member is mounted on the sleeve 86 which is rotatably mounted so that the latch member may swing in a horizontal plane. Formed integrally with the sleeve 86 is a pawl member 87. This member 87 extends beneath the worm gear 77 as indicated. It is provided with a cam member 88 (Figure 11) at its outer end. The worm gear 77 has a depending pin 89 and a depending pin 90 spaced from each other. A spring 91 surrounds sleeve 86 and normally tends to force the pawl member 87 inwardly towards the center of the worm gear. However, when the pin 89 is in the position indicated in Figure 11, further inward movement of the pawl will be precluded.

A second arm 92 (Figure 10) is pivoted to the support 6a as at 92a. This arm extends above the worm gear 77 and is channel shaped (Figure 15). The worm gear is provided with an upwardly projecting pin 93 that extends up into the channel space in this arm. A spring 94 is connected to the arm 92 adjacent the outer or free end thereof and to the arm 78 adjacent its outer or free end.

When the mechanism just described is in the position indicated in Figure 11, the motor circuit is arranged so that the motor 42 will rotate in one direction. Assuming that the worm gear 77 will be driven in the direction indicated by the arrow, the operation of this motor-reversing switch operating mechanism is as follows: The pin 90 will ultimately strike the cam member 88 on the end of the pawl 87 (Figure 15). This will cause both the pawl 87 and the latch member 84 to swing outwardly, disengaging the lug 85 from the outer end of the arm 78 so that it will be permitted to swing over against the other edge of the notch 82. During movement of the pin 90 towards the cam member 88, it must be remembered, the arm 92 will be moved, through the medium of gear 77 and pin 93, from the position indicated in Figure 11 to the opposite side of arm 78. The spring 94 causes a movement of the arm 78 in either direction as soon as the spring moves into an off-center position relative to the arm. A snap movement of the arm 78 occurs at the instant that the arm 78 is released by the latch member 87 and the contact member 80 contacts the other contact point 80b. At this instant, the motor will reversed.

Upon reversal of the motor, the worm gear 77 will rotate in an opposite direction, the arm 92 will move to the opposite side of the center position, the arm 78 will be released by latch member 87 so that it can swing the other way causing the contact member 80 to move into contact with the other contact member 80a. Thus, at regular intervals the motor 42 will be automatically reversed. It will be apparent from this that the stage which carries the targets will first follow a rotary path in one direction and then follow a rotary path in the opposite direction. This reversal of the rotary movement of the stage will occur automatically at regular intervals.

I also provide means for governing the speed of the rotary movement of the target. The governor which I have provided may be adjusted so that the stage will rotate at any desired speed but when finally adjusted, the speed of the rotary movement will be maintained constant unless the governor is again adjusted to vary the speed. This governor is illustrated best in Figures 10, 11, 12 and 16. This governor comprises a cross-arm 95 which has a hub 96 that is keyed to the main drive shaft 43 adjacent its outer end. A similar cross-arm 97 has a hub 98 which is loosely disposed on the shaft 43. The cross arm 97 is free to move longitudinally of the shaft and also rotate relative thereto but the cross-arm 95 is always held in its original position. A diagonally disposed resilient strip 99 has one end pivotally connected to one end of the cross-arm 95 as at 100 and its opposite end connected to the opposite end of the cross-arm 97 as at 101. A second resilient strip 102 is disposed on the opposite side of the shaft and has one of its ends pivotally connected to one end of the cross-arm 95 as at 103 and its opposite end pivotally connected to the opposite end of the cross-arm 97 as at 104. Thus, the cross-arms are joined together by the members 99 and 102 which are arranged like an X. Each of the members 99 and 102 has a weight member 105 secured thereto at a point substantially midway between the ends thereof.

The inner end of the hub 96 on cross-arm 95 has bevelled lugs 106 projecting therefrom. The inner end of the hub 98 of the cross-arm 97 has cooperating bevelled notches 107 formed therein. A spring 108 is connected to the cross-arm 97 and the cross-arm 95 and normally holds these members close together so that the lugs 106 fit into the notches 107.

Formed integrally with the hub 98 of the cross-arm 97 is a disk 109 which will rotate and move longitudinally of the shaft 43 with the cross-arm 97. This disk 109 is always in frictional contact with a ring 110 of felt or the like carried within a member 111 but projecting therefrom. The member 111 is universally mounted as at 112 upon an arm 113. This arm 113 is attached at one end as at 114 to a support 115. The support 115 has a ball 116 loosely disposed in an opening formed therein. This ball contacts with the free end of the arm 113. It is held in the opening by a cam or eccentric 117. This eccentric 117 embodies a small disk which is eccentrically mounted on the inner end of a shaft 118 and is keyed thereto. The shaft 118 is mounted for rotation on the supporting structure 115 in a bearing member 119. A spring 120 surrounds the shaft 118 and maintains the eccentric 117 in proper position relative to the ball 116. A transverse pin 121 is provided adjacent the inner end of shaft 118 for cooperating with a longitudinally extending pin 122 on lug or bearing 119 in order to limit rotation of the shaft. The shaft 118 projects out through an opening in the casing or housing 4 and has a knob 123 keyed to its outer end by means of which it may be rotated.

The operation of the governor will now be described. Assume that the shaft 43 is at rest, the cross-arms 95 and 97 will be close together with the lugs 106 fitting into the notches 107. The knob 123 is rotated to rotate shaft 118 and the eccentric 117 in order that it will force the ball 116 inwardly against the arm 113. This will cause the arm to move inwardly so that the felt ring 110 and the disk 109 will be near each other. With the felt ring and the disk 109 almost in contact, assume that the shaft 43 is rotated, the governor will then operate to prevent excessive speeds of the shaft. As long as the shaft 43 rotates at a proper speed, the lugs 106 will be disposed in the notches 107 and the cross-arm 97 will rotate at the same speed and with the cross-arm 95. If the shaft 43, however, rotates too fast, the weights 105 will be thrown outwardly, due to centrifugal force, to such an extent that the length of the members 99 and 102 will be decreased. This will cause the cross-arm 97 to rotate on the shaft relative to the cross-arm 95 and because of the cooperating bevelled lugs 106 and the bevelled notches 107, the cross-arm 97 will be moved longitudinally and outwardly along the shaft. This will force the disk 109 into frictional contact with the felt ring 110 and, consequently, reduce the speed of rotation of the shaft 43.

Although the cross-arms 97 and 95 are shown for illustrative purposes spaced apart a great distance in Figure 16, it is to be understood that normally they are close together (Figure 11) with the lugs 106 extending into the notches 107. Also, when they are caused to move apart due to excessive speed of the shaft 43, they do not move very far apart.

Thus, the governor will control the speed of the shaft 43 regardless of voltage fluctuations. The maximum speed permitted by the governor may be varied merely by turning the knob 123 which moves the felt ring 110 closer to or farther from the ring 109. The governor will function regardless of the direction of rotation of the shaft 43.

The electrical circuits and controls for the various electrical devices of my machine will now be described in detail.

From the diagram of Figure 17, it will be apparent that a main line 125 is provided which leads from a source of electricity and which has one end connected to a wire 126, each end of which is connected to one of the lights 38. Each light 38 has a second wire 127 connected thereto and to the rheostat 40a of the rheostat switch 40. The circuit then extends from the rheostat through a line 128 to the switch 41a which is operable by the member 41. This switch is of the double throw type. The wire 128 is connected to contact points 129 and 130 on the switch. The switch is also provided with spaced contact points 129a and 130a as indicated. A contact member 131 is provided which is movable by the switch operating arm 41 either into a position where it connects the contact points 130 and 130a or to a position where it connects the contact points 129 and 129a. However, the contact member will always be in either of said positions and will not be in a neutral position as indicated in the drawings.

The contact points 130a of the two switches 41a are connected together by a wire 132. The contact points 129a of the two switches are connected together by a wire 133. A wire 134 has one end connected to the wire 132 and its opposite end connected to one of the contact members 50a of the flasher switch 50. The other contact member 50a of this switch is connected to a wire 135 which has its opposite end connected to the contact member 129a of the switch 41a disposed to the left (Figure 17). From the wire 134 a wire 136 leads and has a resistance element 137 interposed therein. This wire 136 is connected to one of the brushes 42a of the motor 42. The wire 136 also leads to a master switch 138a operable by a lever 138. This switch 138a is connected to the other main line 125a which leads to the source of power. A shunt line 139 is provided which extends from the master switch 138a to a jumper plate 140 which is also connected to the line 136. When alternating current is employed this jumper plate is used but when direct current is employed, the jumper plate is removed and breaks the shunt circuit at this point. The main line 125 is connected to a motor switch 141 which is also connected by a line 142 to the contact member 80 of the motor reversing switch. The contact member 80 is adapted to be in contact with either of the contact members 80a or 80b of the motor reversing switch. One of the contact members 80a is connected to one circuit 143 of the motor and the other contact member 80b is connected to the other motor circuit 144. Both of these motor circuits are connected to the other of the motor brushes 42a.

When it is desired to operate the machine, the master switch 138a is first operated to close the circuit at this point. The motor switch 141 may also be operated to close the circuit at this point. Previous to the closing of the circuit by the master switch, all of the circuits will be dead even if the motor switch is operated to make contact at this point. However, when the master switch is closed, the current will flow through the line 125, line 126, through each of the lights 38, through each of the lines 127, through each of rheostats 40a and through each of the lines 128 to each of the switches 41a. If the contact members 131 of the switches 41a are in position to connect together the contacts 130 and 130a, the current will flow from each of these switches through line 132, line 134, line 136, switch 138a and then through the other main line 125a completing the circuit through the lights. When the members 131 of the switches 41a are in position to connect the contacts 130 to the contacts 130a, the lights 38 will burn constantly. However, the intensity of each of the lights may be varied independently by operating the proper rheostat switch 40. Also, either light may be completely turned off by its rheostat switch.

With the master switch 138a and the motor switch 141 closed, the circuit to the motor is through main line 125, switch 141, line 142, contact member 80 of the motor reversing switch, and then through one of the circuits 143 or 144 and the motor brush 42a at the left. The other side of the circuit is from main line 125a, switch 138a, and line 136 to the other motor brush 42a at the right. The circuit to the motor 42 may be broken without affecting the circuits to the lights, merely by operation of switch 141. The direction of operation of the motor will depend upon which of the contacts 80a or 80b of the motor reversing switch is in contact with the contact member 80. Consequently, the motor will be reversed at regular intervals by the mechanism previously described.

As previously stated, when the contact members 131 of the switches 41a are in position to connect contacts 130 to contacts 130a, the lights will remain burning constantly, provided the rheostat switches 40 have been properly regulated. However, when the switches are so operated that the contact members 131 connect the contacts 129 to the contacts 129a, the lights will be caused to flash at frequent intervals, provided the motor is running at that time. In such an instance, the circuits to the lights will be as follows: through line 125, each line 126, each light 38, each line 127, each rheostat 40a, each line 128, each contact 129, each contact member 131, each contact 129a, through lines 133 and 135 to one of the contacts 50a of the flasher switch, and when said contacts 50a are together, through line 134, line 136, switch 138a and completing the circuit through main line 125a. However, this circuit through the lights will be broken at regular intervals because the member 49 will permit the contact members 50a of the flasher switch to separate at regular intervals as previously explained.

Although I have described the two lights as burning constantly at the same time or flashing together, it will be apparent that one may flash while the other is constantly burning. Each of the switches 41a may be operated independently of the other to cause flashing of the light which it controls or constant burning thereof. Also, each of the rheostat switches may be operated independently of the other to control the intensity of the light which it controls or to turn it off completely. Furthermore, either of the lights or both may be illuminated while the circuit to the motor has been broken by the switch 141. When the master switch 138a is off, however, the motor circuit and the light circuits are dead.

In using the instrument, it is first adjusted to suit the patient by loosening screw 8 and tilting the instrument to the proper angle and then tightening the screw. The chin rest 10 is then adjusted by operating the screw 14 until the eyes of the patient are disposed at the middle or slightly below the middle of the prismatic lenses 19. As previously stated, these prismatic lenses are base-out. The patient should always wear his distance correction which, in conjunction with the spherical correction in the lenses on the instrument, gives complete accommodative relaxation for infinity.

At this time, the knob 72 on the rear of the machine is adjusted relative to the member 64 until the mark on member 64 is in alignment with the zero mark on the member 72. This will indicate that the pins 63 carried by the crank arms 60, which carry the stage 20, will be in alignment with the shafts 55 and 55a. Any suitable cards may then be placed on the target carrying members 24 adjustably carried by the stage 20. For the first test, cards like those illustrated in Figure 20 may be employed.

Figure 18:
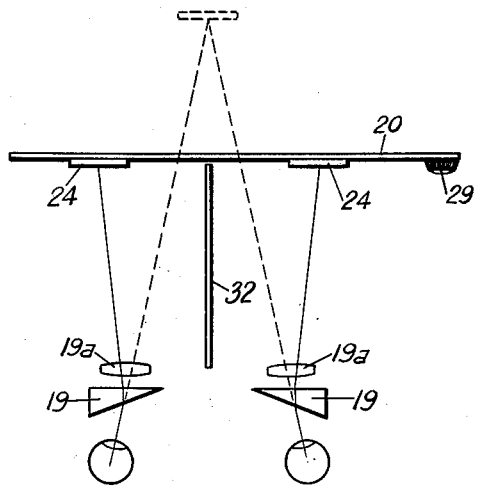
Figure 18 is a more or less diagrammatic view illustrating the purpose of the base-out prisms which are provided with my device.

By referring to Figure 18, the reasons for providing the base-out prismatic lenses 19 will be apparent. In this figure, auxiliary lenses are shown at 19a which are provided for relaxation or stimulation of accommodation and convergence. The targets are indicated at 24 and the septum is indicated at 32. It will be apparent from this figure that because of the fact that the base-out prisms are provided, it will be possible to have the targets spaced apart a considerable distance and, consequently, it will be possible to adjust the targets laterally through a considerable distance.

In treating a patient, this instrument may first be used in determining whether or not there are any imbalances in the eyes and the extent of these imbalances. Then, the instrument may be employed for correcting or overcoming these imbalances.

Figure 20:
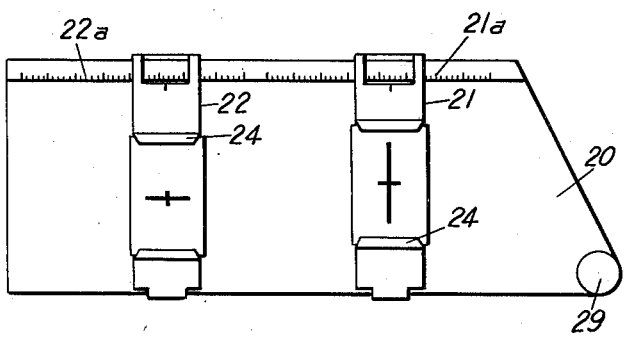
Figure 20 is a front elevation of the stage showing one type of cards or targets mounted thereon which may be used in the initial phoria tests.
Figure 20A:
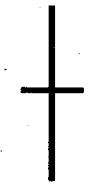
Figure 20a is a view illustrating how the images on the two cards of Figure 20 will be exactly superimposed when fusion is obtained by proper adjustment of the targets.

Thus, assuming that the patient has his distance correction on and that he is looking through the prismatic lenses as indicated by the diagram in Figure 18 and also that cards like those illustrated in Figure 20 are mounted on the stage, as previously described, the first thing to be done is to adjust the target carrying members in such a manner that the imbalances in the patient's eyes will be determined. The targets may be manipulated by the patient himself merely by turning the knob 29. The target should be manipulated by the patient so that the long vertical line on the one card or target passes through the short vertical line in the other target or, in other words, the center of the horizontal line of the other target. The lateral imbalances of the patient's eyes will be indicated by the positions of the targets relative to the scale 21a on the stage 20. The dioptric equivalent may be read from the scale. The targets may also be adjusted vertically independently of each other until the long horizontal line of the one target lies over the shorter horizontal line of the other target. At this time, the patient will see a perfect cross since proper fusion has been obtained (Figure 20a). The dioptric equivalent of the vertical imbalances may be read on the vertical scales 24a. Thus, the phorias in the patient's eyes will be determined and will be indicated in dioptric equivalents.

Figure 21:
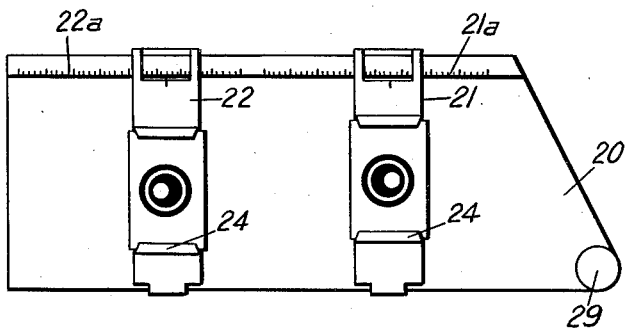
Figure 21 is a similar view showing cards or targets mounted on the stage which may be used in determining whether or not stereopsis is present as well as for duction tests.
Figure 21A:
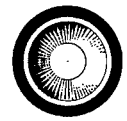
Figure 21a is a view illustrating how the stereoptic images on the cards of Figure 21 will appear when proper fusion is present.

With the indication of the phorias thus obtained, the next step in using the instrument is to determine the ductions of the patient. The stage is still kept immovable and is at zero position so that the patient's gaze is directed straight ahead with the eyes in a position at least approaching that of "minimum innervation". Without changing the position of the card holders, stereoptic cards, which may be of the type illustrated in Figure 21, are placed in the card holders in order to determine whether or not stereopsis is present. These cards are placed with the heavy part of the black inner circles inwardly and when fusion occurs the patient will see something like the image illustrated in Figure 21a. When this stereoptic effect is obtained, the tests for abduction may be made by moving the pictures or cards away from each other until fusion and stereopsis is lost. Then, the indications on the scale 21a are read and noted. In order to test the adduction, the pictures or cards are moved inwardly towards each other until fusion and stereopsis is lost and the indications on the scale 21a are then noted. The vertical ductions may be obtained by similar movement in a vertical direction of one of the targets or cards relative to the other and noting the indications on the scales 24a. The two last findings indicate whether or not treatment is necessary. If in these tests, the range of lateral movement of the targets is insufficient for the particular patient, additional base-out prisms may be mounted on the device as previously indicated, or, additional base-up or base-down prisms may be employed. The prismatic load in the proper direction may be increased readily without interrupting vision by proper adjustment of the targets. The wide latitude of prismatic power both base-in and base-out will also be indicated on the long scale 21a at the top of the stage. Also, the vertical scales 24a will indicate whether base-down or base-up prismatic treatment is required.

With the imbalances indicated to the practitioner and stereopsis thus obtained, the practitioner may then proceed with the treatment to overcome or correct these imbalances. This is done by causing the stage 20 to move in a rotary path and gradually moving the targets towards or from each other depending upon whether the patient has low adduction or abduction. Small excursions and slow speed are necessary in the beginning of most treatments to obtain binocular fixation. However, wide excursions and higher speeds will be necessary for completing the treatments. A wide variety of excursions may be obtained by varying the rotary path of the stage merely by turning the knob 72. The speed of the rotary motion of the stage may be readily controlled by turning knob 123 which controls the governor. However, the speed of the rotary movement of the stage will not change during a treatment unless it is positively changed by controlling the governor. The speed will remain constant at all times regardless of voltage fluctuations or because of continued use. The stage will revolve in one direction a certain number of times and then will be automatically reversed by the mechanism previously described, so that the eye muscles receive a complete exercise. The rotary movement of the stage may be stopped during the treatment, if desired, by operation of the motor switch in order to obtain binocular fixation. By movement of the stage as described, it is possible to establish through these rhythmic excursions and through the gradual adjustment of the targets during the treatments, not only the desired motor nerve impulses to the eye muscles but also to establish over their proper paths, the reciprocal innervations as well.

During the rotary movement of the stage, both of the lights 38 may be on. The intensity of illumination of either light may be controlled independently of the other or one may be turned off without affecting the other. This is done by controlling the rheostat switches 40, thus allowing perfect equalization of the visibility of images with a greater incentive to fusion. Filters are, consequently, unnecessary. Either or both of the lights may also be caused to flash independently by controlling the switches 41, as previously explained. The septum 32 will make the illumination of each target independent of the other. Also, this septum insures that each eye will view but one target.

Auxiliary minus spheres may be mounted on the device, as previously explained, for stimulating accommodation with convergence relaxed by placing the targets in the positions found in the first test. Every possible combination of accommodation and convergence can be stimulated by the use of these or other auxiliary plus or minus spheres of varying powers. Also, as previously explained, auxiliary prisms may be mounted on the device either base-in or base-out when dealing with an extreme type of phoria or strabismus. However, ordinarily the use of auxiliary lenses will not be necessary.

With this instrument the usual procedure in orthoptic training is reversed since, single binocular vision and stereopsis is first obtained before proceeding with the stimulation of the weak ductions. Thus, all phases of orthoptic training are done simultaneously with a great decrease of time as compared to that heretofore necessary in such training.

The procedure of training the muscles is very simple. Orthophoria is indicated when the targets are at the zero marks on the scale 21a. However, if esophoria or esotropia is indicated, it is only necessary to start at any position inside of the zero mark where fusion can be established and gradually train out to the position of orthophoria, going on far enough to build the necessary reserves. Or, in case exophoria or exotropia is indicated by the scale, it is merely necessary to start with the pictures or targets outside the zero mark wherever necessary to get fusion and to work them in as rapidly as possible to the position of orthophoria and continue on beyond this point for the establishment of the necessary reserves. It is unnecessary at this time to think of this treatment as the "base-in" or "base-out" treatment but only as a treatment, going from whatever starting point necessary for fusion to orthophoria and beyond to establish the proper reserves.

Figure 22:
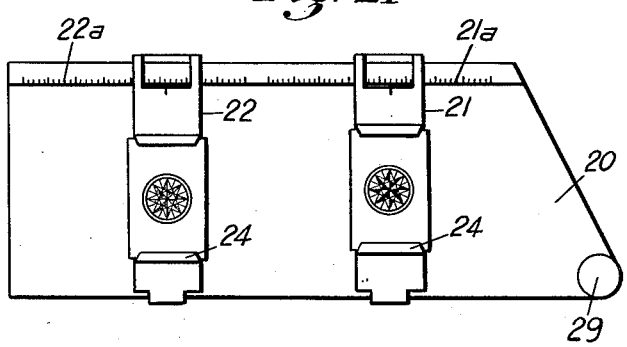
Figure 22 is a similar view showing cards mounted on the stage which carry jewels that may be employed for the stimulation of vision in the amblyope.
Figure 22A:
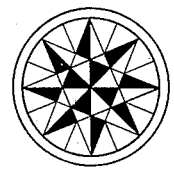
Figure 22a is a view illustrating how the jewelled targets of Figure 22 will appear to the patient.
Figure 23:
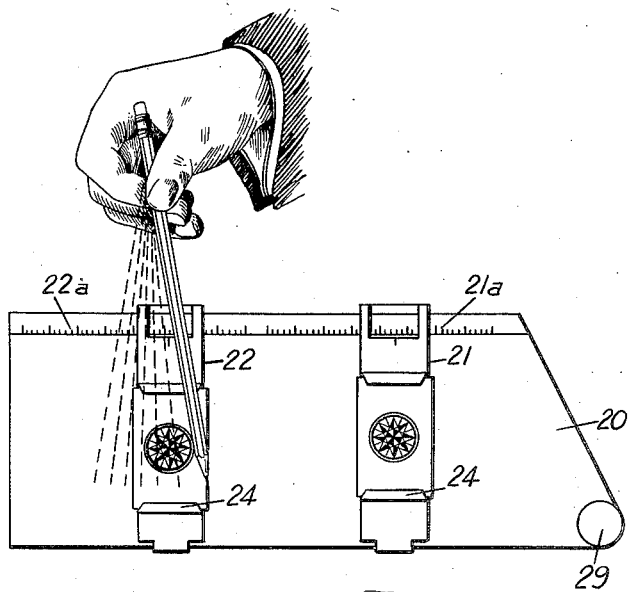
Figure 23 is a view practically identical with that of Figure 20 but illustrating how a lead pencil or wand may be moved back and forth across or around one of the targets to stimulate fixation.

In order to stimulate vision in the amblyopic eye, jewelled targets may be employed as indicated in Figure 22. These targets merely embody jewel members suitably secured to cards. It is preferable to place a green jewel before the dominant eye and a red jewel before the non-dominant, amblyopic or suppressing eye. The illumination on the green target is preferably reduced or eliminated and on the red target brought up to full brilliance. The red target is used on the non-dominant eye because the red has a greater stimulating effect than the green. As a further stimulation to fixation and the development of vision, a wand or lead pencil, as indicated in Figure 23, may be waved back and forth across or around the red target. The light on the green target should be reduced and that on the red target should be increased so that they overlap and are completely superposed one on the other. These two colors are not complementary and will not fuse. This is desirable because it provides a constant check of suppression of either eye.

Although I have just described the manner in which this instrument may be used in treating eyes, it will be apparent that this description is for illustrative purposes only. The instrument is capable of being used in innumerable ways which may be readily discovered by an experienced practitioner.

Figure 24:
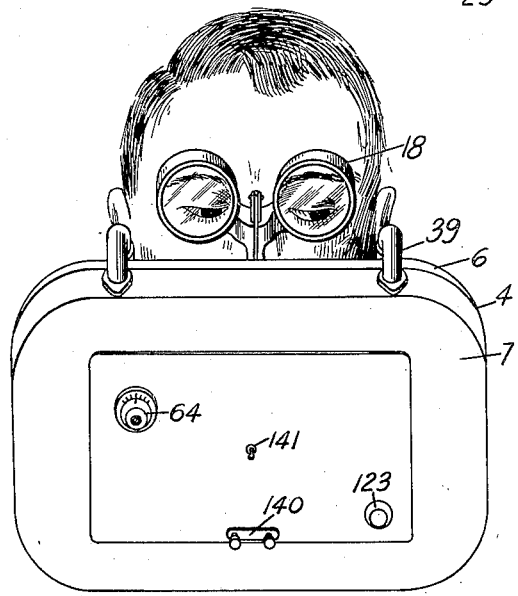
Figure 24 is a view illustrating how the patient's eye will be visible at all times during treatment to any one behind the instrument.

From Figure 24 it will be apparent that the patient's eyes will be clearly visible at all times to the practitioner if he places himself behind the instrument. Thus, during the treatments, the eyes of the patient may be watched. This is an invaluable means of checking up on motility and fixation.

Figure 19:
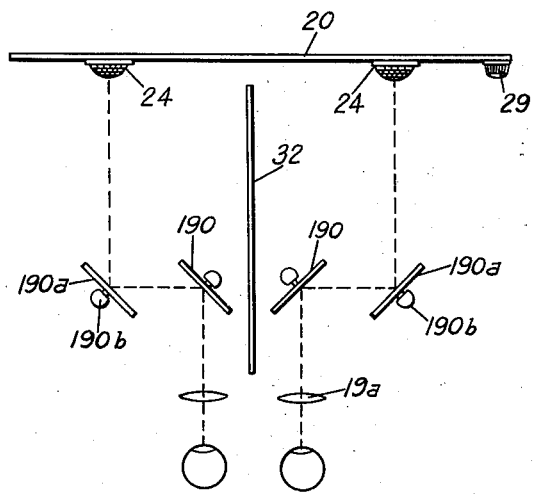
Figure 19 is a view similar to Figure 18 but illustrating how mirrors may be employed instead of the prisms.

By referring to the diagram in Figure 19, it will be seen that I have provided means for taking the place of the base-out prisms 19 and obtaining practically the same results. That is, the targets 24 may still be disposed a considerable distance apart so that a wide range of adjustment will be possible. In this instance, instead of the prisms I provide a pair of mirrors 190 which are arranged directly in front of the eyes. The auxiliary lenses 19a may also be mounted on the device if desired. The mirrors 190 are arranged at an angle converging at their forward ends. A second pair of mirrors 190a is provided which are preferably arranged at the same angle as the mirrors 190. The targets 24 are spaced apart a considerable distance and the mirrors 190a are also spaced apart considerably. However, the images on the targets will be reflected in mirrors 190a which will in turn reflect them into the mirrors 190 and then into the eyes of the patient. The lines of sight are indicated by the dotted lines. All of the mirrors are preferably adjustably mounted through the medium of ball and socket joints 190b so that they may be tilted universally. Thus, the mirrors can be adjusted to give extra prismatic effect.

In Figure 25, I show a different arrangement for controlling the flashing of the two lights 38, that illuminate the targets. With this arrangement the two lights can be flashed not only independently of each other but the flashing of one light may be adjusted relative to that of the other so that one light will be "on" while the other is "off" and vice-versa, or any other arrangement of flashing of the two lights relative to each other suitable for treating the particular patient, may be obtained. Also, with the structure illustrated in this figure, the periods during which a light is dark will be irregular, and the light may be dark for longer periods than it is light, and vice-versa.

Figure 14:
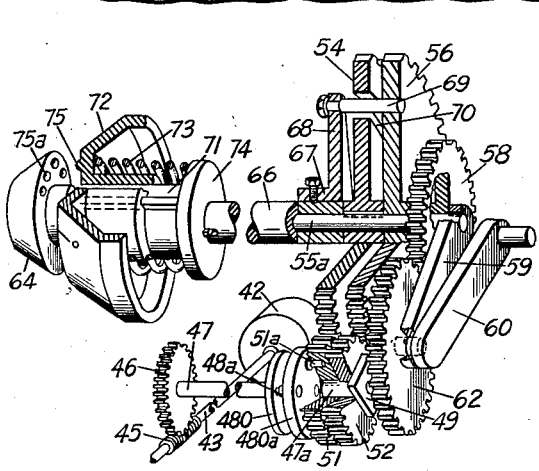
Figure 14 is a perspective view, partly broken away, of the mechanism used for rotating the crank arms and for adjusting the crank arms.

In this figure a shaft 470 is shown which corresponds to the shaft 47a of the structure previously described and shown in Figures 11, 12 and 14. This shaft 470 carries substantially rectangular members 49a and 49b which are similar to the square member 49 of the other structure. These members 49a and 49b are so carried by the shaft that they may be rotated thereon relative to each other and held in any adjusted position. The member 49a is adapted to control a flashing switch 500a and the member 49b is adapted to control a flashing switch 500b, each of which embodies a pair of resilient contact members that normally tend to remain out of contact with each other. However, when the shaft 470 is rotated and the members 49a and 49b are, consequently, rotated, the contact members are forced together at intervals. The flashing switch 500a is connected to one of the lights and the flashing switch 500b is connected to the other light, in a manner apparent from the preceding description.

In the structure previously described, the member 49 that controls the flashing switch is square and, consequently, the flashing of the lights will occur at regular intervals. However, the members 49a and 49b are rectangular and all the flashing intervals will not be the same. When the members 49a and 49b are of this particular shape, during two of the periods the light will be dark for a short time, while during two other periods it will be dark for a longer time, and the shorter and longer periods alternate with each other. Also, the dark and light periods will not be the same. However, it will be understood that the shape of these members may be widely varied, so that any arrangement of dark and light periods may be obtained, which is suitable for the particular patient. This is desirable in exercising the ciliary muscles of accommodation by causing them to contract and relax. These muscles will contract during light periods and relax during dark periods and it is desirable to vary these periods to suit various patients. The members 49a and 49b may be readily replaced with other members of a different shape. The shape of said members may be such that the light periods will be longer than the dark periods, and vice-versa.

It is important to have the members 49a and 49b so mounted that they may be rotated relative to each other. When they are adjusted relative to each other as indicated in this figure, both of the lights will be illuminated and be dark at intervals, but one of the lights will be "on" while the other is "off" and vice versa. However, these members may be adjusted so that flashing of both lights occurs simultaneously. The member 49a may be adjusted relative to the member 49b in any desired manner to produce any desired arrangement of flashing of the lights relative to each other.

It will be apparent from the preceding description that I have provided an instrument which may be used in orthopic training for effectively directing the exercising of the muscles of the eyes to improve the tonicity thereof and to correct conditions and habits of improper innervations. This apparatus is capable of meeting all needs of orthopic training in all its phases, namely: first, as an aid in the reduction of amblyopia ex anopsia; second, to establish simultaneous binocular vision; third, for stereoscopic fusion training; fourth, for the building of reserves for comfortable vision.

This instrument is of such a nature that it may be employed first for quickly and accurately detecting the imbalances or other defects of the eyes and may be used subsequently for correcting or overcoming such imbalances or other defects. It is of such a nature that it may be employed in subjecting the eyes to training in such a manner as to induce normal habits only and the results of training with this apparatus will be of a permanent value. The operation of the apparatus is based on the recognition that all the associated movement of the eyes become more or less habitual through repetition. It is designed to and does establish through rhythmic excursions of the eyes, both the desired motor nerve impulses and the direction of the reciprocal innervations over their proper paths, thus, accomplishing proper group action of not only the muscles of each eye but a coordination of both groups in their normal versions in all meridians.

The instrument may be adjusted so that single binocular vision may be obtained by the patient. The targets are moved in closed paths without any rocking movement. Furthermore, both of the targets move simultaneously in the same direction and to the same extent in such a manner that any straight line drawn on the surface of each target will move into successive positions which are parallel with each other. Consequently, there will be no danger of single binocular vision being lost during the rotary movement of the targets. In other words the various targets that may be used will always maintain their initial vertical position. They do not turn over as they move about their centers of rotation.

In using this instrument, the usual procedure of treatment is reversed in that vision in the amblyopic or suppressing eye is developed and fusion and stereopsis is trained, before attempting the stimulation of ductions, thus developing tonicity and motility more rapidly. Stimulation of the extrinsic muscles in the desired direction is increased in much less time with the aid of stereopsis, and stereopsis must be present before permanent relief or cure can be obtained by orthoptic training.

The targets may be placed so that the images will be in line with the visual axis of each eye before either fusion or stereopsis is sought to be induced and will be accurately held in such positions during the exercising of the eyes so that fusion and stereopsis will not be lost. However, the targets may be gradually moved from time to time as the treatments progress in order to properly exercise the eyes and overcome imbalances.

With this instrument rotary excursions are used in training the eye. With this motion alone is it possible to secure perfect group action and coordination between the muscles thereby training normal, natural associated eye movements in all meridians. Both the range of movement of the stage and the speed of movement can be readily controlled and varied so that as the treatments progress, the range of movement and the speed of movement of the stage may be increased. Slow motion and small excursions are necessary in the first steps of securing binocular single vision when disassociation has become a habit.

The illumination of each target is independent of that of the other target due to the independent controls for the lights and the provision of the septum. The intensity of illumination of each light may be controlled independently in order to equalize the images when treating amblyopia. Another important feature is the provision of the means for flashing either light which interrupts the vision of either eye rhythmically for overcoming suppression or suspension of vision and for stimulation of accommodation.

I provide means for the development of third dimension or stereoscopic vision by the use of stereoscopic images. These images may be placed in line with the visual axis of each eye and will be held in such positions during the rotary movement of the stage. Consequently, there will be no danger of fusion and stereopsis being destroyed during the treatments.

Many other objects and advantages will be readily apparent to those skilled in the art from the preceding description, the accompanying drawings and the following claims.

I claim:

1. An optical instrument of the type described comprising a pair of targets to be viewed by the patient, means for obtaining single binocular vision of the two targets in the eyes of the patient, means for moving both of said targets simultaneously in the same direction and to the same extent at all times through closed paths, and means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained.

2. An optical instrument of the type described comprising a pair of targets to be viewed by the patient, means for insuring that each eye will view one target only, means for obtaining single binocular vision of the two targets in the eyes of the patient, means for moving both of said targets simultaneously in the same direction and to the same extent at all times through closed paths, and means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained.

3. An optical instrument of the type described comprising a pair of targets to be viewed by the patient, means for obtaining single binocular vision of the two targets in the eyes of the patient, means for moving both of said targets simultaneously in the same direction and to the same extent through closed paths in such a manner that any straight line drawn on the surface of each target will move into successive positions which are parallel with each other, and means for simultaneously varying the path of movement of both of said targets.

4. An optical instrument of the type described comprising a pair of targets to be viewed by the patient, means for obtaining single binocular vision of the two targets in the eyes of the patient, means for moving both of said targets simultaneously in the same direction and to the same extent at all times through closed paths, means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained, and means for simultaneously reversing the direction of movement of both targets.

5. An optical instrument of the type described comprising a pair of targets to be viewed by the patient, means for obtaining single binocular vision of the two targets in the eyes of the patient, means for moving both of said targets simultaneously in the same direction and to the same extent at all times through closed paths, means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained, and means for simultaneously varying the rate of movement of both targets by the same amount.

6. An optical instrument of the type described comprising a pair of targets to be viewed by the patient, means for insuring that each eye will view one target only, means for obtaining single binocular vision of the two targets in the eyes of the patient, means for moving both of said targets simultaneously in the same direction and to the same extent at all times through closed paths, means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained, means for simultaneously varying the path of movement of both targets, means for simultaneously varying the rate of movement of both targets, and means for simultaneously reversing the direction of movement of both targets.

7. An optical instrument of the type described comprising a plurality of targets to be viewed by the patient, a stage upon which said targets are mounted, means for moving said stage in a closed path, said means including a plurality of crank arms which carry said stage, and means for simultaneously changing the throw of said crank arms by the same amount.

8. An optical instrument of the type described comprising a pair of stereograms to be viewed by the patient, means for obtaining fusion of the stereograms by the patient, means for moving both of said stereograms simultaneously in the same direction and to the same extent at all times through closed paths, and means for preventing said stereograms from rocking relative to each other and from overturning during movement thereof so that they are normally maintained in a preselected position relative to each other and for causing them to move in such a manner that any straight line drawn on the surface of either stereogram will move into successive positions which are parallel with each other at all times so that fusion thereby may be maintained.

9. An optical instrument of the type described comprising a pair of targets to be viewed by the patient, means for obtaining single binocular vision of the two targets in the eyes of the patient, means for moving both of said targets simultaneously in the same direction and to the same extent at all times through closed paths, means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained, and means for simultaneously varying the path of movement of both of said targets.

10. An optical instrument of the type described comprising a plurality of targets to be viewed by the patient, means for obtaining single binocular vision of said targets in the eyes of the patient, means for bodily moving said targets simultaneously in the said direction and to the same extent at all times through closed paths, and means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained.

11. An optical instrument of the type described comprising a pair of targets to be viewed by the patient, means for obtaining single binocular vision of the two targets in the eyes of the patient, means for moving both of said targets simultaneously in the same direction and to the same extent at all times through closed paths, means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained, and automatically operative means for simultaneously reversing the direction of movement of both targets at preselected intervals.

12. An optical instrument of the type described comprising a pair of targets to be viewed by the patient, said targets being mounted on the instrument in such a manner that they may be laterally adjusted in order to obtain single binocular vision of the two targets in the eyes of the patient, means for moving both of said targets simultaneously in the same direction and to the same extent at all times through closed paths, and means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained.

13. An optical instrument of the type described comprising a pair of targets to be viewed by the patient, said targets being mounted on the instrument in such a manner that they may be adjusted both laterally and vertically in order to obtain single binocular vision of the two targets in the eyes of the patient, means for moving both of said targets simultaneously in the same direction and to the same extent at all times through closed paths, and means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained.

14. An optical instrument of the type described comprising a pair of targets to be viewed by the patient, means for obtaining single binocular vision of the two targets in the eyes of the patient, means for moving both of said targets simultaneously in the same direction and to the same extent at all times through closed paths, means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained, and means for positively changing the relative positions of said targets both while they are at rest and while they are moving.

15. An optical instrument of the type described comprising a pair of targets to be viewed by the patient, means for obtaining single binocular vision of the two targets in the eyes of the patient and including means for permitting said targets to be disposed out of line with the visual axes of the patient, means for moving both of said targets simultaneously in the same direction and to the same extent at all times through closed paths, and means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained.

16. An optical instrument of the type described comprising a pair of targets to be viewed by the patient, means for obtaining single binocular vision of the two targets in the eyes of the patient and including prismatic lenses for permitting said targets to be disposed out of line with the visual axes of the patient, means for moving both of said targets simultaneously in the same direction and to the same extent at all times through closed paths, and means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained.

17. An optical instrument of the type described comprising a pair of targets to be viewed by the patient, means for obtaining single binocular vision of the two targets in the eyes of the patient and including mirrors for permitting said targets to be disposed out of line with the visual axes of the patient, means for moving both of said targets simultaneously in the same direction and to the same extent at all times through closed paths, and means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained.

18. An optical instrument of the type described comprising a pair of targets to be viewed by the patient, a single stage upon which both of said targets are mounted, said targets being adjustable on the stage relative to each other so that fusion of the targets by the patient may be obtained, means for moving said stage bodily in a closed path, and means for preventing the stage from rocking or overturning during movement thereof and for causing it to move in such a manner that any straight line drawn on the surface thereof will move into successive positions which are parallel with each other.

19. An optical instrument of the type described comprising a pair of targets to be viewed by the patient, a single stage upon which both of said targets are mounted, said targets being adjustable on the stage relative to each other so that fusion of the targets by the patient may be obtained, means for moving said stage bodily in a closed path, means for preventing the stage from rocking or overturning during movement thereof and for causing it to move in such a manner that any straight line drawn on the surface thereof will move into successive positions which are parallel with each other, and means for varying the path of movement of said stage.

20. An optical instrument of the type described comprising a pair of targets to be viewed by the patient, a single stage upon which both of said targets are mounted, said targets being adjustable on the stage relative to each other so that fusion of the targets by the patient may be obtained, means for moving said stage bodily in a closed path, means for preventing the stage from rocking or overturning during movement thereof and for causing it to move in such a manner that any straight line drawn on the surface thereof will move into successive positions which are parallel with each other, a governor for normally maintaining the speed of movement of said stage, and means for adjusting said governor in order to positively vary the speed of movement of said stage.

21. An optical instrument of the type described comprising a pair of targets to be viewed by the patient, a single stage upon which both of said targets are mounted, said targets being adjustable on the stage relative to each other so that fusion of the targets by the patient may be obtained, means for moving said stage bodily in a closed path, means for preventing the stage from rocking or overturning during movement thereof and for causing it to move in such a manner that any straight line drawn on the surface thereof will move into successive positions which are parallel with each other, and means for automatically reversing the direction of movement of said stage at preselected intervals.

22. An optical instrument of the type described comprising a pair of targets to be viewed by the patient, a single stage upon which both of said targets are mounted, said targets being adjustable on the stage relative to each other, so that fusion of the targets by the patient may be obtained, means for moving said stage bodily in a closed path, means for preventing the stage from rocking or overturning during movement thereof and for causing it to move in such a manner that any straight line drawn on the surface thereof will move into successive positions which are parallel with each other, means for controlling and varying the speed of movement of said stage, means for varying the path of movement of said stage, and means for reversing the direction of movement of said stage.

23. An optical instrument of the type described comprising a pair of targets to be viewed by the patient, a single stage upon which both of said targets are mounted, said targets being laterally adjustable on the stage relative to each other so that fusion of the targets by the patient may be obtained, means for simultaneously adjusting both of said targets to the same extent toward and away from each other, means for moving said stage bodily in a closed path, and means for preventing the stage from rocking or overturning during movement thereof and for causing it to move in such a manner that any straight line drawn on the surface thereof will move into successive positions which are parallel with each other.

24. An optical instrument of the type described comprising a pair of targets to be viewed by the patient, a single stage upon which both of said targets are mounted, said targets being both laterally and vertically adjustable on the stage relative to each other so that fusion of the targets by the patient may be obtained, means for moving said stage bodily in a closed path, and means for preventing the stage from rocking or overturning during movement thereof and for causing it to move in such a manner that any straight line drawn on the surface thereof will move into successive positions which are parallel with each other.

25. An optical instrument of the type described comprising a pair of targets to be viewed by the patient, a single stage upon which both of said targets are mounted, said targets being both laterally and vertically adjustable on the stage relative to each other so that fusion of the targets by the patient may be obtained, calibrated scales carried by the stage for cooperating with the adjustable targets to indicate imbalances of the eyes of the patient, means for moving said stage bodily in a closed path, and means for preventing the stage from rocking or overturning during movement thereof and for causing it to move in such a manner that any straight line drawn on the surface thereof will move into successive positions which are parallel with each other.

26. An optical instrument of the type described comprising a pair of targets to be viewed by the patient, a stage upon which both of said targets are mounted, a septum located between said targets for insuring that the patient will see one target only with each eye, said targets being adjustable on the stage relative to each other so that fusion of the targets by the patient may be obtained, means for moving said stage bodily in a closed path, and means for preventing the stage from rocking or overturning during movement thereof and for causing it to move in such a manner that any straight line drawn on the surface thereof will move into successive positions which are parallel with each other.

27. An optical instrument of the type described comprising a pair of targets to be viewed by the patient, a single stage upon which both of said targets are mounted, a septum located between said targets for insuring that the patient will see one target only with each eye, said targets being adjustable on the stage relative to each other so that fusion of the targets by the patient may be obtained, means for permitting said targets to be located out of line with the visual axes of the patient, means for moving said stage bodily in a closed path, and means for preventing the stage from rocking or overturning during movement thereof and for causing it to move in such a manner that any straight line drawn on the surface thereof will move into successive positions which are parallel with each other.

28. An optical instrument of the type described comprising a pair of targets to be viewed by the patient, a stage upon which both of said targets are mounted, a septum located between said targets for insuring that the patient will see one target only with each eye, said targets being adjustable on the stage relative to each other so that fusion of the targets by the patient may be obtained, means for moving said stage bodily in a closed path, means for preventing the stage from rocking or overturning during movement thereof and for causing it to move in such a manner that any straight line drawn on the surface thereof will move into successive positions which are parallel with each other, and means for illuminating each of said targets.

29. An optical instrument of the type described comprising a pair of targets to be viewed by the patient, a stage upon which both of said targets are mounted, a septum located between said targets for insuring that the patient will see one target only with each eye, said targets being adjustable on the stage relative to each other so that fusion of the targets by the patient may be obtained, means for moving said stage bodily in a closed path, means for preventing the stage from rocking or overturning during movement thereof and for causing it to move in such a manner that any straight line drawn on the surface thereof will move into successive positions which are parallel with each other, an independent source of illumination for each target, and means for varying the intensity of the illumination on each target.

30. An optical instrument of the type described comprising a pair of targets to be viewed by the patient, a single stage upon which both of said targets are mounted, a septum located between said targets for insuring that the patient will see one target only with each eye, said targets being adjustable on the stage relative to each other so that fusion of the targets by the patient may be obtained, means for moving said stage bodily in a closed path, means for preventing the stage from rocking or overturning during movement thereof and for causing it to move in such a manner that any straight line drawn on the surface thereof will move into successive positions which are parallel with each other, an independent source of light for each target, and means for flashing the light for each target independently of the other or for flashing both of them together.

31. An optical instrument of the type described comprising a pair of targets to be viewed by the patient, a single stage upon which both of said targets are mounted, a septum located between said targets for insuring that the patient will see one target only with each eye, said targets being adjustable on the stage relative to each other so that fusion of the targets by the patient may be obtained, means for moving said stage bodily in a closed path, means for preventing the stage from rocking or overturning during movement thereof and for causing it to move in such a manner that any straight line drawn on the surface thereof will move into successive positions which are parallel with each other, an independent light for each target, means for flashing the light for each target independently of the other, and means for controlling the intensity of each light independently of the other.

32. An optical instrument of the type described comprising a pair of targets to be viewed by the patient, means for obtaining single binocular vision of the two targets in the eyes of the patient, means for moving both of said targets simultaneously in the same direction and to the same extent at all times through closed paths, means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained, a source of light for illuminating the targets, and means for flashing the light for the targets at irregular intervals in such a manner that the length of light periods varies relative to the length of dark periods.

33. An optical instrument of the type described comprising a pair of targets to be viewed by the patient, means for obtaining single binocular vision of the two targets in the eyes of the patient, means for moving both of said targets simultaneously in the same direction and to the same extent at all times through closed paths, means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained, an independent source of light for illuminating each target, and means for flashing the light for one target independently of the other at irregular intervals in such a manner that the length of light periods varies relative to the length of dark periods.

34. An optical instrument of the type described comprising a pair of targets to be viewed by the patient, means for obtaining single binocular vision of the two targets in the eyes of the patient, means for moving both of said targets simultaneously in the same direction and to the same extent at all times through closed paths, means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained, a source of light for illuminating the targets, and means for flashing the light at irregular intervals in such a manner that all light periods are not the same length relative to each other and all dark periods are not the same length relative to each other.

35. An optical instrument of the type described comprising a pair of targets to be viewed by the patient, means for obtaining single binocular vision of the two targets in the eyes of the patient, means for moving both of said targets simultaneously in the same direction and to the same extent at all times through closed paths, means for preventing said targets from rocking relative to each other and from overturning during movement thereof so that they are normally maintained in a preselected position relative to each other and for causing them to move in such a manner that any straight line drawn on the surface of either target will move into successive positions which are parallel with each other at all times so that single binocular vision thereby may be maintained, a pair of lights for illuminating the targets, means for flashing one light independently of the other, and means for regulating the period of flashing of one light relative to those of the other light so that they may both flash simultaneously, alternately or in any other manner desired relative to each other.

LE ROY WOTTRING.